(12) United States Patent
Kucik et al.

(10) Patent No.: US 8,732,973 B2
(45) Date of Patent: May 27, 2014

(54) MEASUREMENT DEVICE

(76) Inventors: Mark G. Kucik, Evergreen Park, IL (US); Martin A. Trlak, New Lenox, IL (US)

( * ) Notice: Subject to any disclaimer, the term of this patent is extended or adjusted under 35 U.S.C. 154(b) by 202 days.

(21) Appl. No.: 13/546,203

(22) Filed: Jul. 11, 2012

(65) Prior Publication Data

US 2013/0014400 A1    Jan. 17, 2013

Related U.S. Application Data

(60) Provisional application No. 61/506,342, filed on Jul. 11, 2011.

(51) Int. Cl.
*B43L 7/00* (2006.01)
*G01B 3/10* (2006.01)

(52) U.S. Cl.
CPC .................................... *G01B 3/1082* (2013.01)

USPC .................................................. 33/759; 33/494

(58) Field of Classification Search
CPC ........... B43L 7/00; G01B 3/04; G01B 3/1082
USPC ....... 33/485, 494, 755, 758, 759, 760, DIG. 1
See application file for complete search history.

(56) References Cited

U.S. PATENT DOCUMENTS

| 5,335,421 | A   | * | 8/1994 | Jones, Jr. ........................ 33/494 |
| 6,785,976 | B1  | * | 9/2004 | Morehouse ..................... 33/495 |
| 8,015,719 | B2  | * | 9/2011 | Juhl ........................ 33/DIG. 10 |
| 2008/0148587 | A1 | * | 6/2008 | Goodrich ........................ 33/529 |
| 2009/0139106 | A1 | * | 6/2009 | Delaurier ........................ 33/759 |
| 2012/0017486 | A1 | * | 1/2012 | Jones .............................. 42/120 |
| 2012/0227275 | A1 | * | 9/2012 | Goldrick et al. ................ 33/562 |

* cited by examiner

*Primary Examiner* — G. Bradley Bennett
(74) *Attorney, Agent, or Firm* — Matthew De Preter; Rockey & Lyons

(57) ABSTRACT

The subject matter of the invention relates to a measuring device for determining the bend length of a rod or pipe based on the actual desired length of the rod or pipe without the need to perform a calculation.

15 Claims, 2 Drawing Sheets

MEASUREMENT DEVICE

CROSS-REFERENCE TO RELATED APPLICATION

This patent application claims the benefit of U.S. Provisional Patent Application No. 61/506,342 filed Jul. 11, 2011 which is incorporated by reference in its entirety herein.

FEDERALLY SPONSORED RESEARCH OR DEVELOPMENT

Not Applicable.

BACKGROUND OF THE INVENTION

The present invention relates generally to a measurement device for easily determining the bend point of a pipe or rod. As is well known, the bend point is the location on a pipe where the bend point indicator of a traditional pipe bending tool should be placed in order to properly bend a pipe.

Traditionally, measurement devices, such as tape measures, included one or two measurement scales, such as imperial and metric scales, each beginning at zero and progressing uniformly upward over the length of the devices. A person using a traditional measurement device to measure a pipe and determine where the pipe should be bent to achieve the appropriate pipe length would need to subtract a particular distance from the actual measured length of the straight pipe in order to determine the correct bend point for the pipe. The distance subtracted is a function of the diameter of the pipe. Making the calculation to determine the proper bend point is tedious, time consuming and prone to human error. It requires the operator to remember the appropriate distance to be subtracted for the appropriate pipe being measured and then to perform an error free calculation. It is desirable that there be a tool which can simply inform the operator what the proper bend point is for a desired length of pipe without the need to perform any calculations.

As described in detail below, the present invention provides a unique solution to the aforementioned problems.

SUMMARY OF THE INVENTION

The present invention relates to uniquely delineated measurement device. The measurement device may be of any size or shape. The measuring device is generally comprised of a piece of material having a length and a width, the length being greater than the width, and may be in the shape of a rectangle. Thus the measurement device has a front side and a reverse side as well as a top, corresponding to a first length, and a bottom, corresponding to a second length. For explanatory purposes, the measurement device will be described herein according to its preferred embodiment having a construction mimicking that of a traditional tape measure. The tape measure furls within a housing and may be extracted from the housing in order to take the measurements.

The tape is delineated by markings identifying measurements. In a traditional measuring tape utilizing the imperial system (i.e., inches and feet), the measuring tape includes hash marks along its length in fixed increments corresponding to the appropriate imperial dimension. Thus, a traditional ten foot measuring tape would generally include ten hash marks along its length in one foot increments, as well as 120 hash marks along its length in one inch increments. The foot incremental hash marks are identified each by their combine length, thus numbered 1 to 10, and the inch incremental hash marks are similarly identified, thus numbered 1 to 120. Traditionally, each inch marking is further delineated by a series of hash marks showing 1/16 inch, 1/8 inch, 1/4 inch and 1/2 inch subdivisions of the one inch increment. The hash marks and numbering are traditionally marked along one side of the measuring tape.

According to the present invention, a traditional measuring tape as described above is further delineated by at least one additional series of incremental hash marks along its length. The additional series of marks are on the same surface of the tape as the traditional marks, but located on the opposite side of the tape such that when looking down at the measuring tape, both series of marks may be seen. Preferably, the same units are used for both series of marks (i.e., both are delineated according to the imperial system or both are delineated according to the metric system). The second set of marks, however, do not start at zero and increment up as the traditional marks do. Rather, the second set of marks begins at a predetermined offset number and increment up uniformly therefrom. The appropriate starting offset number is determined by the diameter of the pipe or rod that is being measured. In use, the traditional series will inform the user what the actual length of the pipe being measured is, while the offset series will inform that user as to the value for the appropriate bend length of the pipe being measured.

DETAILED DESCRIPTION OF THE PREFERRED EMBODIMENTS

Throughout the specification, wherever practicable, like structures will be identified by like reference numbers.

Figure 1:
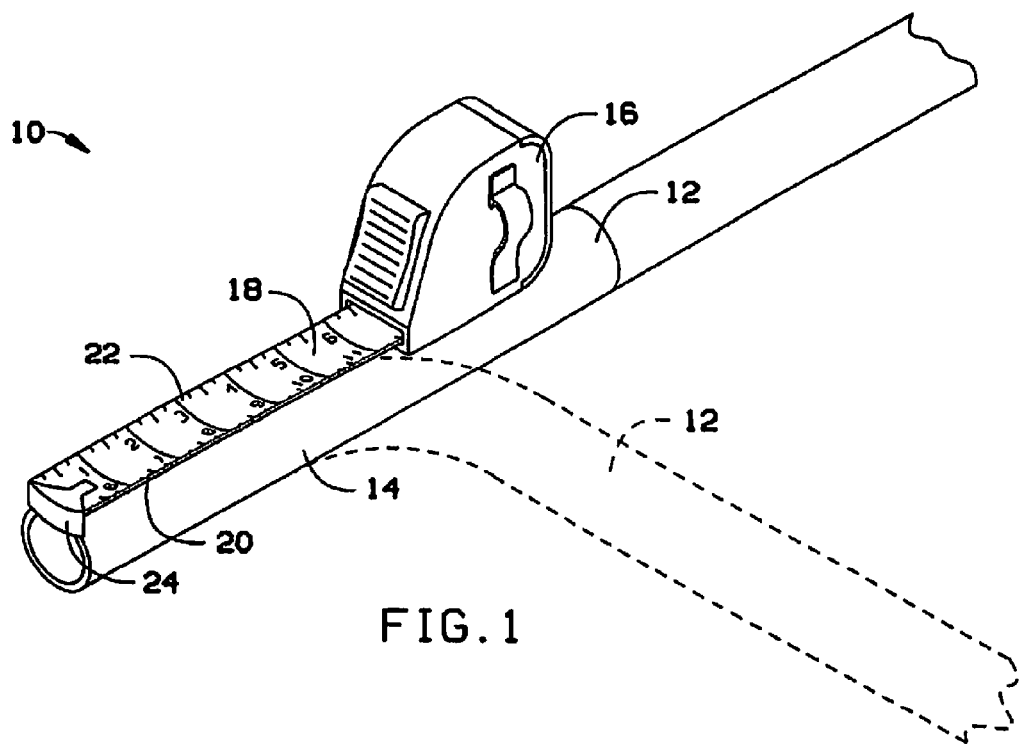
FIG. 1 is a perspective view of an embodiment of the invention in use.

A preferred embodiment, generally identified as 10, of the present invention is shown in FIG. 1. The construction of the preferred embodiment comprises a housing 16, which houses a furling tape 18 having a first end (not shown) which is fixed within the housing and a second, distal end. Preferably, the distal end is further equipped with a grip 24, which may be in the form of a metal flap, barb or hook. The grip 24 may also be magnetic to help prevent the distal end of the tape from sliding off of the pipe 12 during measurement. The tape 18 of the measurement device includes two scales, a first actual measurement scale 22 along a first length of the tape 18, and a second bend point scale 20 along a second length of the tape 18. In the embodiment shown in FIG. 1, each scale is represented on the front side of the tape 18, the reverse side of tape 18 is not shown. The bend point of pipe 12 is identified as 14. As is shown in FIG. 1, the straight pipe may be bent such that the curvature of the bent pipe, shown in hash lines, begins at the bend point 14.

Figure 2:
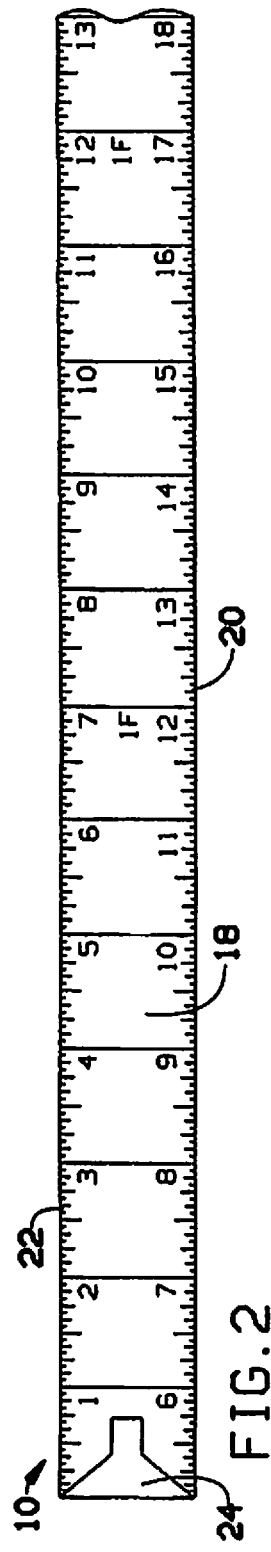
FIG. 2 is a plan view of the invention having a traditional series of hash marks and a second series of hash marks offset by a first value.

Referring now to FIG. 1 and FIG. 2, the actual measurement scale 22 begins at zero and progresses upward along the length of the tape 18. The actual measurement scale informs a user what the actual length of a measured item is in some standardized unit scale (the imperial scale in FIGS. 1 and 2). Preferably the actual measurement scale 22 is represented in a first color, such as black. Tape 18 includes a second scale, the bend point scale 20 along the length of the tape opposite that of the actual measurement scale 22. The bend point scale 20 utilizes the same unit scale as the actual measurement scale 22, however, the bend point scale is offset from the actual measurement scale by a predetermined offset amount. The offset amount correlates to the particular diameter of pipe that is to be bent. In FIG. 1 and FIG. 2, the offset amount is five inches which is the offset required for pipe having a half inch diameter. Thus the bend point scale 20 begins at five and uniformly progresses upward. Preferably, to avoid confusion between the actual measurement scale 22 and the bend point scale 20, the bend point scale is represented in a second color, such as blue. It should be apparent that the colors of the actual measurement scale 22 and the bend point scale 20 could be of any color, and even the same color, though it is preferable that they are represented by different colors.

Figure 3:
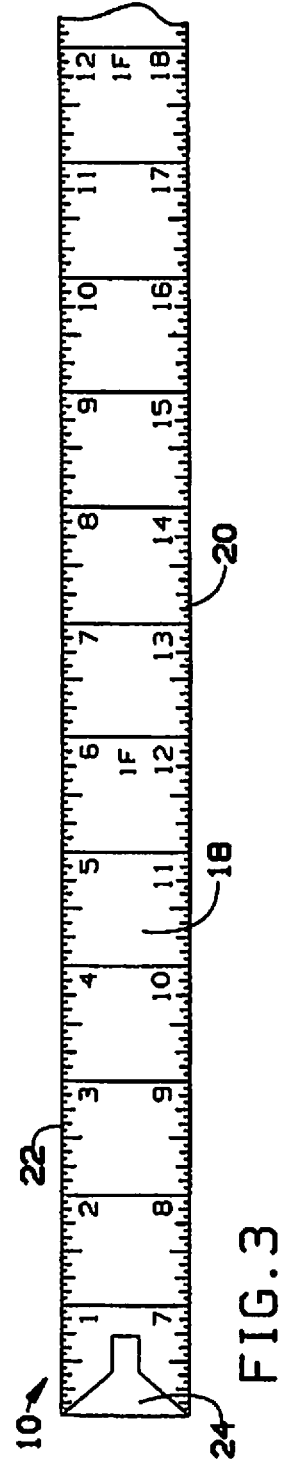
FIG. 3 is a plan view of the invention having a traditional series of hash marks and a second series of hash marks offset by a second value.
Figure 4:
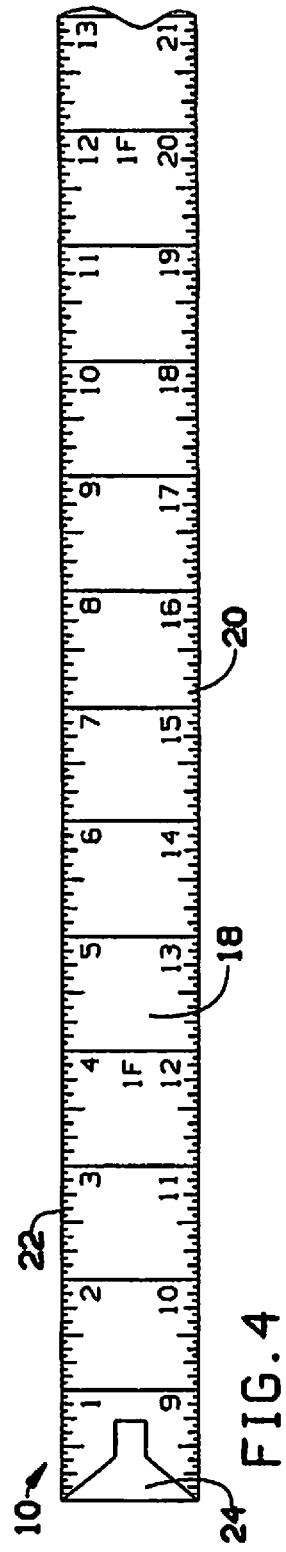
FIG. 4 is a plan view of the invention having a traditional series of hash marks and a second series of hash marks offset by a third value.

FIG. 3 and FIG. 4 depict alternate embodiments. In FIG. 3, the bend point scale 20 is offset by six inches. Thus, the bend point scale begins at six and progresses uniformly upward along the length of tape 18. The six inch offset may be used when the pipe to be bent has a diameter of three and one quarter inches. In FIG. 4, the bend point scale 20 is offset by 8 inches. Thus, the bend point scale begins at eight and progresses uniformly upward along the length of tape 18. The eight inch offset may be used when the pipe to be bent has a diameter of one inch.

While it is preferable that the measuring device include two separate scales, one on either length of a first side of the tape, it is conceivable that additional scales could be added. For example, the reverse side of the measuring device could include additional scales, one being the actual measurement scale and another being a second bend point scale having a different offset than the bend point scale provided on the front side of the measuring device. Alternately, the reverse side scales could be represented in alternate standard units such that the scales on the front side are represented in imperial units while the scales on the reverse side are represented in metric units. Furthermore, it is contemplated that the measuring device include only a single set of delineations, but the delineations are identified by an actual measurement numeral and as well as a bend point numeral which is offset from the actual measurement numeral by a predetermined amount corresponding to the appropriate offset for a particular diameter pipe to be bent. In such an embodiment it is preferable that the actual measurement numerals and the bend point numerals are represented in differing colors Although the present invention has been described in terms of the preferred embodiments, it is to be understood that such disclosure is not intended to be limiting. Various alterations and modifications will be readily apparent to those of skill in the art. Accordingly, it is intended that the appended claims be interpreted as covering all alterations and modifications as fall within the spirit and scope of the invention.

What is claimed is:

1. A measurement device comprising:
    a piece of material having a length and a width, the length being greater than the width, the material having a plurality of first indication marks provided along a first length and a plurality of second indication marks provided along a second length,
    wherein the plurality first indication marks are separated from each other along the first length of the material according to a first predetermined scale;
    wherein at least one of the plurality of first indication marks is identified by a first numeral;
    wherein the plurality second indication marks are separated from each other along the second length of the material according to the first predetermined scale;
    wherein at least one of the plurality of second indication marks is identified by a second numeral; and
    wherein the first numeral identifies the actual length of the material according to the first predetermined scale and the second numeral is offset from the first numeral by a predetermined amount, the predetermined amount corresponding to a predetermined offset length.

2. The measurement device of claim 1 wherein the first numeral is a first color and the second numeral is a second color.

3. The measurement device of claim 1 further comprising a grip located along at least part of one width of the material.

4. The measurement device of claim 3 wherein the grip is magnetic.

5. The measurement device of claim 1 wherein a plurality of the first indication marks are identified by a plurality of first numerals, the plurality of first numerals being uniformly incremented from small numbers to large numbers along the length of the material; and
    wherein a plurality of the second indication marks are identified by a plurality of second numerals, the plurality of second numerals being uniformly incremented from small numbers to large numbers along the length of the material and offset from the first numerals by a predetermined amount, the predetermined amount corresponding to a predetermined offset length.

6. The measurement device of claim 1 wherein the first predetermined scale is an imperial scale,
    wherein at least one of the first indication marks is located a distance of one inch from a first width of the material and a plurality of the first indication marks are separated from each other by a distance of one inch progressing along the first length of the material from the first width of the material toward a second width of the material, the first indication marks being identified by the first numerals so as to identify the actual length of the material according to the imperial scale;
    wherein at least one of the second indication marks is located a distance of one inch from the first width of the material and a plurality of the second indication marks are separated from each other by a distance of one inch progressing along the second length of the material from the first width of the material toward a second width of the material, the second indication marks being identified by the second numerals so as to identify an offset length of the material according to the imperial scale.

7. A measurement device comprising:
    a tape measure having a length and a width, the length being greater than the width, said tape measure having a plurality of first indication marks provided along a first length and a plurality of second indication marks provided along a second length,
    wherein the plurality first indication marks are separated from each other along the first length of the tape measure according to a first predetermined scale;
    wherein at least one of the plurality of first indication marks is identified by a first numeral;
    wherein the plurality second indication marks are separated from each other along the second length of the tape measure according to the first predetermined scale;
    wherein at least one of the plurality of second indication marks is identified by a second numeral; and wherein the first numeral identifies the actual length of the tape measure according to the first predetermined scale and the second numeral is offset from the first numeral by a predetermined amount, the predetermined amount corresponding to a predetermined offset length.

8. The measurement device of claim 7 comprising:
a housing, wherein the tape measure may furl within said housing and unfurl from said housing, one end of said tape measure being fixed within said housing and a second, distal end of said tape being free to extend away from said housing so as to unfurl said tape measure from said housing.

9. The measurement device of claim 8 wherein the first numeral is a first color and the second numeral is a second color.

10. The measurement device of claim 8 further comprising a grip connected to the distal end of said tape measure.

11. The measurement device of claim 10 wherein the grip is magnetic.

12. A measurement device comprising:
a piece of material having a length and a width, the length being greater than the width, the material having a plurality of first indication marks provided along a first length wherein the first indication marks are separated from each other along the first length of the material according to a first predetermined scale, wherein at least one of the plurality of first indication marks is identified by a first numeral, the first numeral indicating the length of the material according to the first predetermined scale; and wherein the at least one of the plurality of first indication marks is identified by a second numeral, the second numeral being offset from the first numeral by a predetermined amount, the predetermined amount corresponding to a predetermined offset length.

13. The measurement device of claim 7 wherein the first numeral is a first color and the second numeral is a second color.

14. The measurement device of claim 7 further comprising a grip located along at least part of one width of the material.

15. The measurement device of claim 9 wherein the grip is magnetic.

* * * * *